United States Patent
Boesch

(10) Patent No.: US 6,295,522 B1
(45) Date of Patent: *Sep. 25, 2001

(54) STORED-VALUE CARD VALUE ACQUISITION METHOD AND APPARATUS

(75) Inventor: Brian P. Boesch, Oak Hill, VA (US)

(73) Assignee: CyberCash, Inc., Reston, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,441

(22) Filed: Jul. 11, 1997

(51) Int. Cl.[7] .................................................. G06F 17/60
(52) U.S. Cl. ............................................. 705/41; 705/53
(58) Field of Search .................................. 705/26, 41, 42, 705/39, 43, 44; 235/380, 379; 902/25, 26

(56) References Cited

U.S. PATENT DOCUMENTS

| | | | |
|---|---|---|---|
| 4,961,142 | * 10/1990 | Elliot et al. | 364/408 |
| 5,557,518 | * 9/1996 | Rosen | 364/408 |
| 5,591,949 | 1/1997 | Bernstein | 235/380 |
| 5,623,547 | 4/1997 | Jones et al. | 380/24 |
| 5,642,419 | 6/1997 | Rosen | 380/23 |
| 5,644,118 | 7/1997 | Hayashida | 235/379 |
| 5,650,604 | 7/1997 | Marcous et al. | 235/379 |
| 5,659,165 | 8/1997 | Jennings et al. | 235/379 |
| 5,666,420 | 9/1997 | Micali | 380/30 |
| 5,671,280 | 9/1997 | Rosen | 380/24 |
| 5,677,955 | 10/1997 | Doggett et al. | 380/24 |
| 5,749,078 | * 5/1998 | Gargiulo et al. | 705/404 |
| 5,770,844 | * 6/1998 | Henn | 235/380 |
| 5,778,067 | * 7/1998 | Jones et al. | 380/24 |
| 5,802,497 | * 9/1998 | Manasse | 705/27 |
| 5,809,143 | * 9/1998 | Hughes | 380/24 |
| 5,815,665 | * 9/1998 | Teper et al. | 395/200.59 |
| 5,825,003 | * 10/1998 | Jennings et al. | 235/379 |
| 5,825,881 | * 10/1998 | Colvin, Sr. | 380/24 |
| 5,839,119 | * 11/1998 | Krsul et al. | 705/39 |
| 6,138,107 | * 10/2000 | Elgamal | 705/39 |

OTHER PUBLICATIONS

D. O'Mahony, M. Peirce and H. Tewari, Electronic Payment Systems, Artech House, Inc., pp. 77–81, Jan. 1, 1997.*

* cited by examiner

Primary Examiner—Tariq R. Hafiz
Assistant Examiner—Susanna Meinecke-Diaz
(74) Attorney, Agent, or Firm—Roberts Abokhair & Mardula, LLC

(57) ABSTRACT

A system and method for the use of stored value cards when either a consumer or a merchant does not possess a stored value card. A consumer value acquirer receives funds from the bank account of a given consumer. The consumer value acquirer also has a pool of stored value cards that are not assigned to any specific consumer but which are used on behalf of consumers wishing to purchase goods or services via stored value card transaction. The consumer value acquirer acts as a proxy for the consumer and uses one of the pool of stored value cards on behalf of the consumer in a transaction with a merchant that uses stored value cards. Once funds stored value card funds are transferred to the merchant during a transaction, the consumer account with the consumer value acquirer is debited the amount of the transaction.

16 Claims, 5 Drawing Sheets

STORED-VALUE CARD VALUE ACQUISITION METHOD AND APPARATUS

FIELD OF THE INVENTION

This invention relates generally to transfer of value between consumers and merchants using stored-value cards. More specifically this invention relates to a system and method for transferring electronic money between a customer and a merchant when one or the other does not possess a stored-value card or the underlying infrastructure.

BACKGROUND OF THE INVENTION

With the advent of the Internet and other methods of electronic communication as well as the increasing flexibility and sophistication of microchips, there is an emerging trend to engage in "cashless" transactions. Such transactions are typified by electronic transfer of funds of one form or another with no paper money actually changing hands.

Historically, credit cards are one such form of cashless transaction methodology. The typical situation is for a consumer to present a credit card either in person or over the telephone to a merchant or a service provider (collectively a "merchant"). The merchant verifies that the credit card is valid and accepts what amounts to a promise of payment from a credit card service for the goods or services that are provided to the consumer. The problem with credit card transactions is that a merchant must wait a certain number of days for finds to be received for goods that are shipped immediately. Further, the merchant must pay a "penalty" in the form of a credit card commission for the certainty of receiving funds from the credit card company. Thus from both a time and "cost of doing business" perspective credit cards have certain disadvantages for merchants.

Debit cards are yet another attempt to engage in cashless transactions. In a debit card scenario rather than funds being accessed by a credit card company, a debit card accesses funds that are directly in a consumer's bank account. Thus if money is present in a consumer's bank account, such money may be spent. If insufficient funds are present in the account, the amount of a purchase cannot be spent. The debit card also leads to faster transfer of funds since funds are transferred out of the account of the consumer when money is spent. However, there is still a lag in time for money to reach the merchant's bank account.

An approach to the immediate receipt of funds in a cashless transaction is the "stored value card." The stored-value card comprises a credit card-like device with a microchip embedded in the card. The microchip comprises storage capability and other security features which prevent its being tampered with. The stored-value card allows an electronic representation of a consumer's money to be stored on the card. That money is deducted from a consumer's bank account and represented in electronic form on the stored-value card.

When a merchant is prepared to accept the stored-value cards, that merchant has a stored value card of its own coupled to a transfer device. That transfer device could be a point of sale terminal optimized for stored-value transactions. When a consumer desires to purchase goods or services with a stored-value card the consumer takes the stored-value card to the point of sale, and inserts the stored-value card in the point of sale device. Using the security features on the card, funds are then subtracted from the consumer's stored-value card and transferred to the stored-value card of the merchant. In this fashion the electronic representations of cash are immediately transferred and made available to the merchant and immediately deducted from the consumer. Thus there is no delay and processing expense is minimized.

In this fashion the typical transfer where money comes from a consumer and must be settled through a consumer's bank to a settling agency thereafter sent to a merchant's bank and thereafter sent to the merchant's account is eliminated from the process. Thus the entire settlement procedure and the attendant time delay is eliminated.

A stored-value card of this fashion is represented in an embodiment marketed by Mondex USA. This system comprises credit card-like devices with a microprocessor embedded in the "credit card" which in turn digitally stores the consumer's electronic equivalent of cash.

While stored-value cards eliminate the settlement time and give certainty to the consumer/merchant transaction, a difficulty with use of stored value cards is that both the merchant and the consumer must be using their respective cards simultaneously. A consumer who desires to purchase goods and services who goes to a merchant that does not have stored-value card equipment, simply cannot purchase goods and services without using a credit card or cash or some other transaction. Similarly a consumer who does not have a stored-value card that goes to a merchant that has stored-value card equipment and infrastructure has no way to pay the merchant in the rapid fashion embodied in the stored-value card technology.

A need therefore exists to allow consumers and merchants to purchase goods and services and deliver goods and services to one another using stored value card technology, when one of the parties does not have such technology.

SUMMARY OF THE INVENTION

It is therefore an object of the present invention to take advantage of stored-value card technology.

It is a further object of the present invention to permit consumers, who do not have stored-value cards, to nonetheless take advantage of stored-value card technology.

It is a further objective of the present invention to allow merchants, who do not have stored-value card technology, to interact with consumers who possess stored-value cards.

It is a further objective of the present invention to establish trusted value acquirers who can broker transactions between consumers who do not have stored-value cards and merchants who possess stored-value card technology, and vice versa.

It is a further objective of the present invention to establish trusted value acquirers associated with merchants who can interact with consumers possessing stored-value cards so that transactions using stored-value technology can take place.

These and other objectives of the present invention will become apparent to those skilled in the art after review of the detailed description of the preferred embodiment that follows.

The present invention involves establishing a network among a consumer, a consumer value acquirer (CVA), and a merchant that accepts stored-value card transactions. The consumer initiates a transaction via the consumer's computer terminal establishing communication with a merchant through a CVA over a network, preferably the Internet. The CVA comprises a computer capable of handling the communications associated with the purchasing of goods and services. In addition, however, the CVA has a database of a number of consumers who do not possess stored-value cards but who wish to make such transactions. Each consumer's account stored in the database is established by the consumer authorizing funds to be transferred into the account at the CVA from the consumer's bank account. This transfer of funds can be via an ACH transaction, wiring of funds to the CVA consumer account, payment of money directly to the CVA, or any other method whereby the CVA can establish a reservoir of funds earmarked for use by the consumer. Alternatively the CVA can advance credit to the consumer or otherwise wait for payment from the consumer at a later time by other means.

In addition to the database of consumers and electronic funds stored for the account of the consumer, the CVA possesses a pool of stored-value cards for use in transactions on behalf of consumers. Typically the number of cards in the pool will be substantially less than the number of consumers who might use them. They are simply present to facilitate stored-value transactions. Thus the CVA has access to use of stored-value cards and the appropriate communications protocol associated therewith which can be used at any time on behalf of consumers.

When a consumer desires to purchase any particular goods or services, the CVA checks to determine if funds are available to the customer and assigns one of the cards in the card pool to the particular transaction. Further, the CVA serves as a gateway for the customer to access the desired merchant.

After the merchant is contacted and the goods or services to be delivered are established as present, the merchant sends a message to the consumer noting the cost of the goods or services in question. However, the message is received by the consumer and the CVA. The CVA then acts as a proxy for the consumer in interacting with the merchant for the exchange of money over the Internet. Money is then transferred via the appropriate stored-value card protocol from the CVA to the merchant's stored-value card thus completing the transaction. Thereafter the goods and/or services are delivered to the consumer.

After the close of the transaction, the CVA in turn deducts money from the consumer's account for transfer to the merchant using the stored-value card protocols.

In a situation where the consumer possesses a stored-value card and the merchant does not, a merchant value acquirer (MVA) performs the same function as would be performed by the CVA, that is, establishing a database of merchants in which electronic funds can be stored, and having appropriate communications protocol to communicate with consumers using stored-value cards over the Internet.

Another method of using the present invention involves the consumer contacting the merchant directly over the Internet for the purchase of goods or services. Since Internet communication is capable of establishing multiple communications simultaneously among parties during the course of a stored-value card transaction, the consumer contacts not only the merchant but also the CVA to have the CVA involved in the transaction. When messages debiting the stored-value card are sent from the merchant to the consumer the CVA receives the message and again assuming appropriate funds are available in the CVA database associated with the customer, a transaction can be completed.

DETAILED DESCRIPTION OF THE PREFERRED EMBODIMENT

Figure 1:
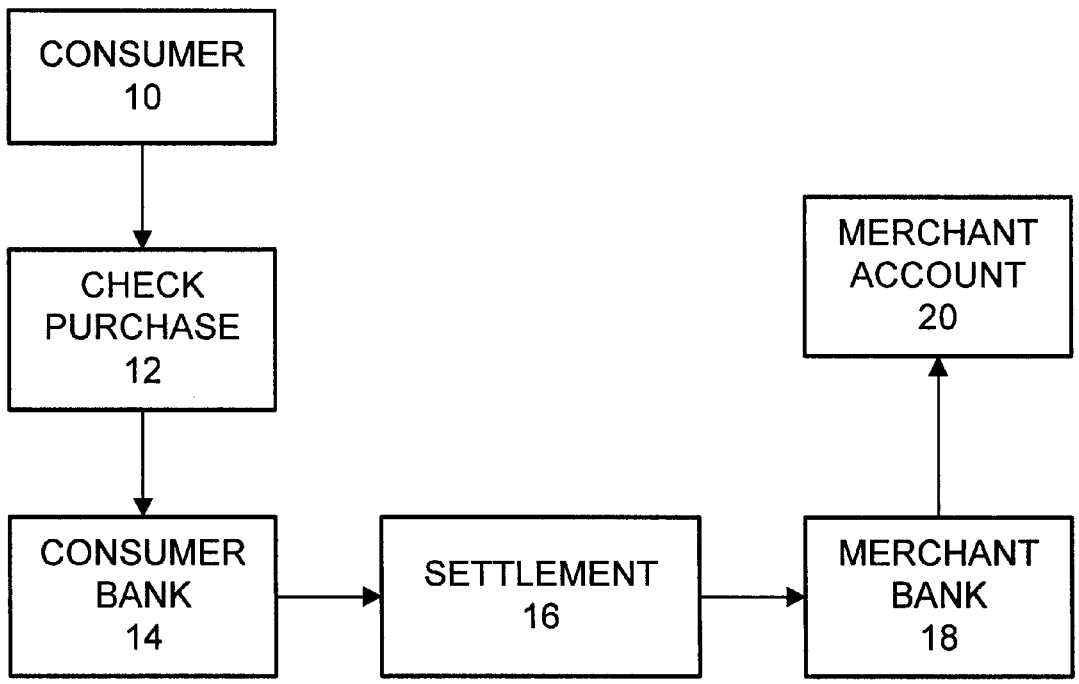
FIG. 1—Traditional consumer/merchant cashless transaction.

Referring to FIG. 1 the traditional check based transaction is described. In this case the consumer 10 writes a check 12 to a merchant. Once the merchant accepts the check for the transaction the check is ultimately sent to the consumer's bank 14 where it is settled 16 via typical ACH transactions. Funds are then made available to the merchant's bank 18 and then credited to the account of the merchant 20.

This process while historically effective, has some time delay which is frequently unacceptable to merchants and can lead to fraud in the market place.

Figure 2:
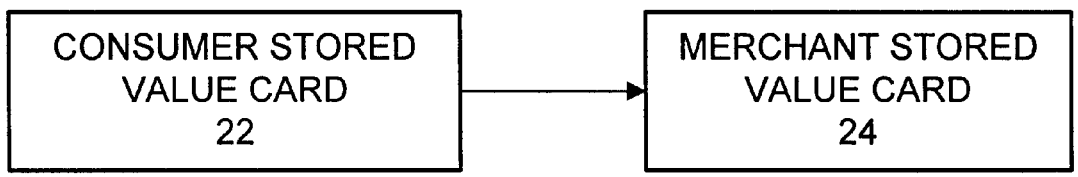
FIG. 2—Stored value card transaction.

Referring to FIG. 2 the stored-value card transaction is described. In contrast to the traditional check based transaction, the stored value card transaction is very simple. Once the consumer stored value card is credited with electronic "money" the consumer 22 presents the store value card to the merchant 24 which simply inserts the card in a stored value card apparatus whereupon the amount of the transaction is deducted from the consumer stored value card and credited to the merchant's stored value card. Thus the crediting of funds is immediate and fraud associated with the "float" of funds is eliminated.

Figure 3:
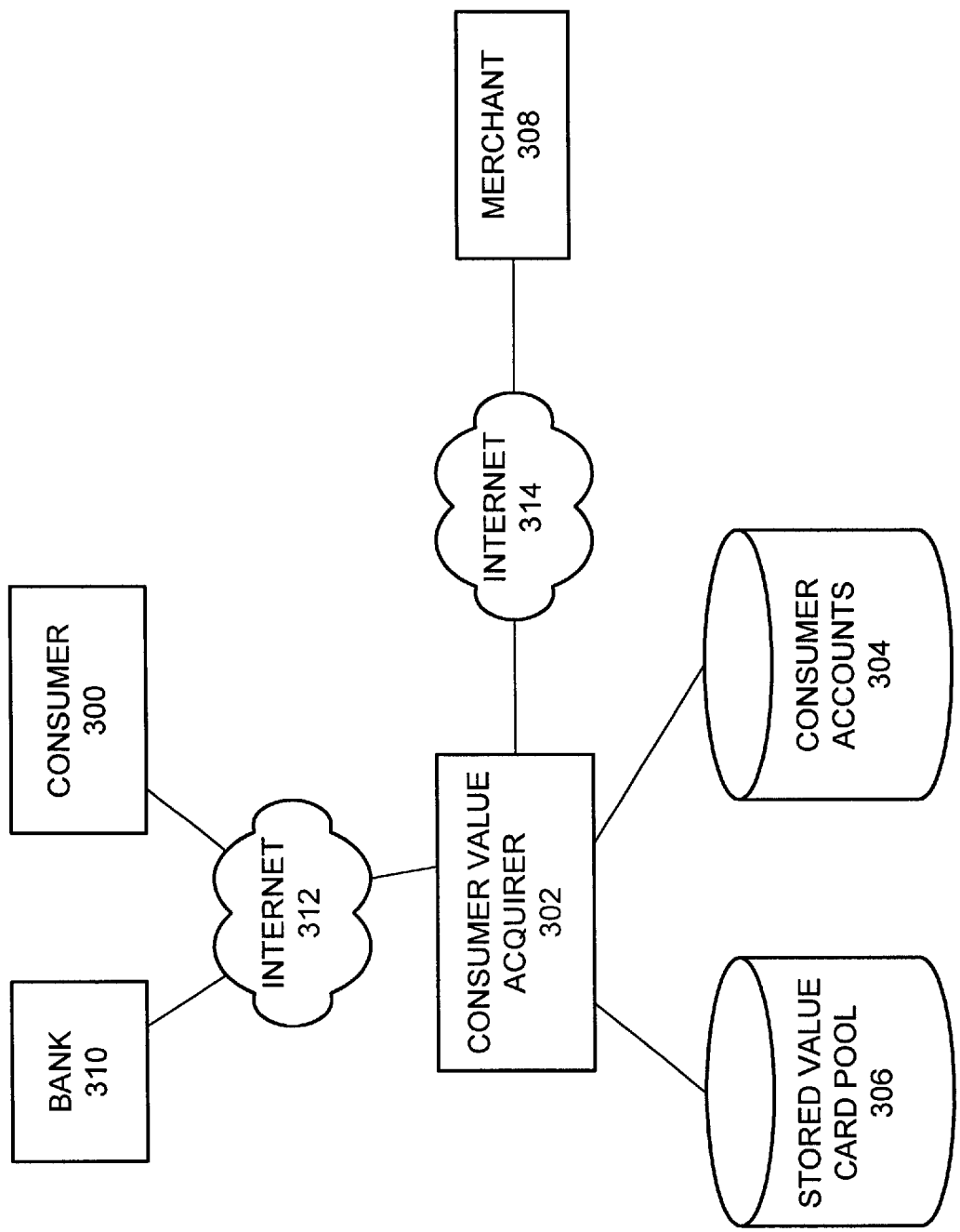
FIG. 3—Stored value card transaction—no consumer stored value card.

Referring to FIG. 3 the preferred embodiment of the stored-value card exchanges is described. Consumer 300 establishes an account by a variety of known methods in the value acquirer 302. This account establishes an amount of money that the consumer 300 can spend on goods and services. The consumer can establish this value account by direct transfer from a bank 310 to the consumer value acquirer (CVA) 302, depositing a check with CVA 302 or any other means whereby value from the customer 300 can be transferred to the account of the CVA 302. Information concerning individual consumer accounts and the amount in each account is stored in the CVA database of consumer accounts 304.

The CVA also possesses a pool of stored-value cards which it uses for purchasing goods and services on behalf of consumers. This pool of stored-value cards 306 issues by the CVA 302 for interactions with a merchant 308.

In practice consumer 300 would contact the CVA 302 instructing it to contact merchant 308. In practice there will be some form of authentication of the identity of the consumer by the CVA. This is necessary to ensure that the person contacting the CVA is authorized to do so and to spend funds from a particular consumer account. This authentication can be via a password, pass phrase, digital signature or other authentication methods known in the art. The merchant 308 having a stored value card transaction system desires to have funds transferred to it for the products that are delivered to the consumer. The consumer purchases the goods or services from the merchant 308 who then sends a message to the stored-value card of the CVA. It is important to note however that at all times the merchant 308 appears to be dealing with the consumer 300. The fact that the merchant 308 is dealing with the CVA 302 is important only in the fact that the CVA possesses "virtual" monies in a consumer's wallet that can then be transferred to the merchant and the merchant's stored-value card.

In this fashion a large number of customers can benefit from the use of a small number of stored-value cards. This CVA simply keeps track in its database 304 of how much money each consumer uses when the various stored value cards of the CVA are utilized on behalf of the individual consumers.

Figure 4:
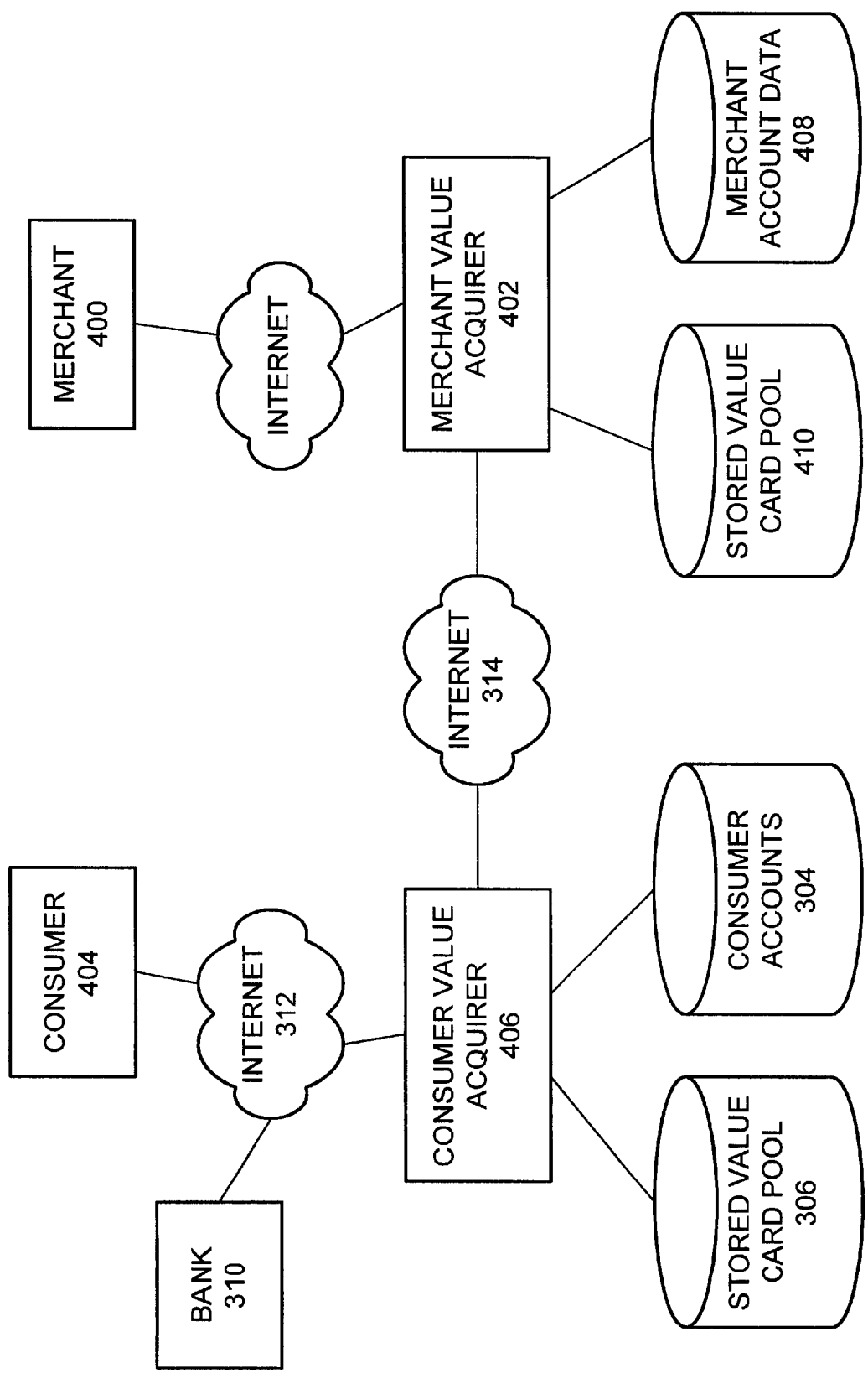
FIG. 4—Stored value card transaction—no merchant stored value card.

Referring to FIG. 4 it may also be the case that merchants want to take advantage of stored-value cards without having the infrastructure present in the various merchant locations. In this case a merchant value acquirer 402 is utilized. In this case consumer 404 interacts with its CVA 406 to purchase goods and services from a merchant 400. Again the consumer contacts the merchant through the CVA only in this case, the communication link runs through the merchant value acquirer (MVA) 402 to the merchant. The merchant then notes the availability of goods or services to the consumer through the communications chain noted. Again the consumer has established a certain value with the CVA 406 that can be spent by the consumer in goods and services. In this case the CVA 406 interacts with the MVA 402 to transfer money from the consumer's wallet to the merchant's wallet. This interaction takes place with the appropriate protocol with funds being transferred from CVA 406 to MVA 402. After funds have been transferred from a series of purchases of goods and services, money is deposited and kept track of in the MVA account associated with the merchant 400. At the merchant's discretion the money can be sent elsewhere or simply deposited via an ACH transaction to the merchant's bank account. In a similar fashion to the CVA, the MVA comprises a database of all merchants who utilize the MVA services 408 and a pool of stored value cards 410 which are used to receive money from consumers or indeed to transfer money to those with whom the merchant does business.

Figure 5:
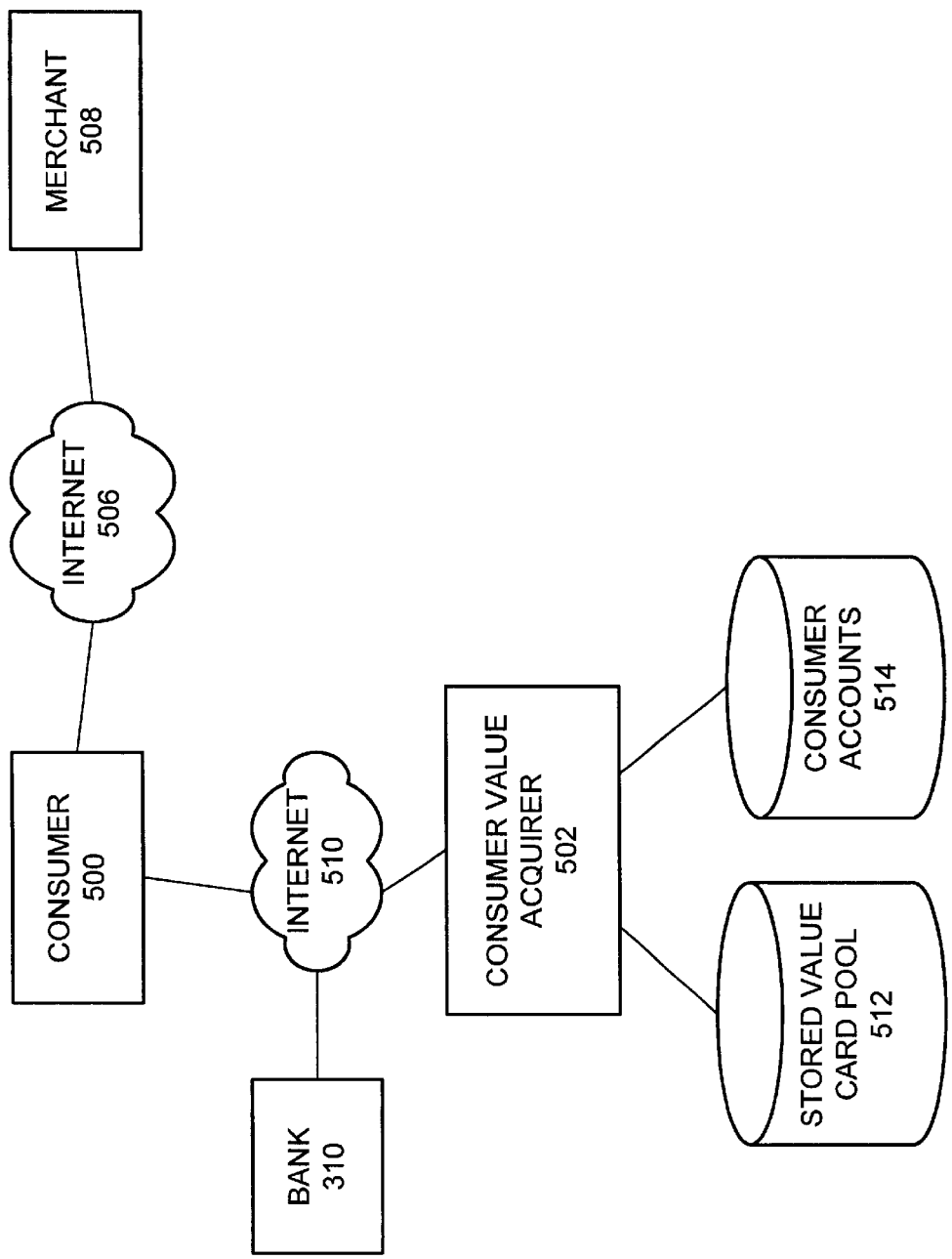
FIG. 5—Alternative embodiment of stored value card transaction—no customer stored value card.

Referring to FIG. 5 an alternative embodiment is shown. In this case the consumer simultaneously establishes communication with the CVA 502 and the merchant 508. In this instance the merchant 508 has stored value card equipment and infrastructure. The consumer establishes communication with the merchant 508 over a network 506 such as the Internet and simultaneously establishes communication for the transaction in question with the consumer CVA 502 over another network 510, which may also be the Internet. When the merchant 508 sends a message associated with the cost of the goods or services being purchased by the consumer, that message is received both by the consumer 500 and the CVA 502. Using the card pools 512 in the CVA 502 the CVA 502 can interact using its stored-value cards with the stored-value card of the merchant. The CVA 502 simply verifies whether there is sufficient money in the consumer's account by verifying account balances in the CVA database 514. If appropriate monies are available the amounts are transferred via the stored-value card being used from the card pool 512 to the merchant 508 and goods and services are thereby purchased.

Figure 6:
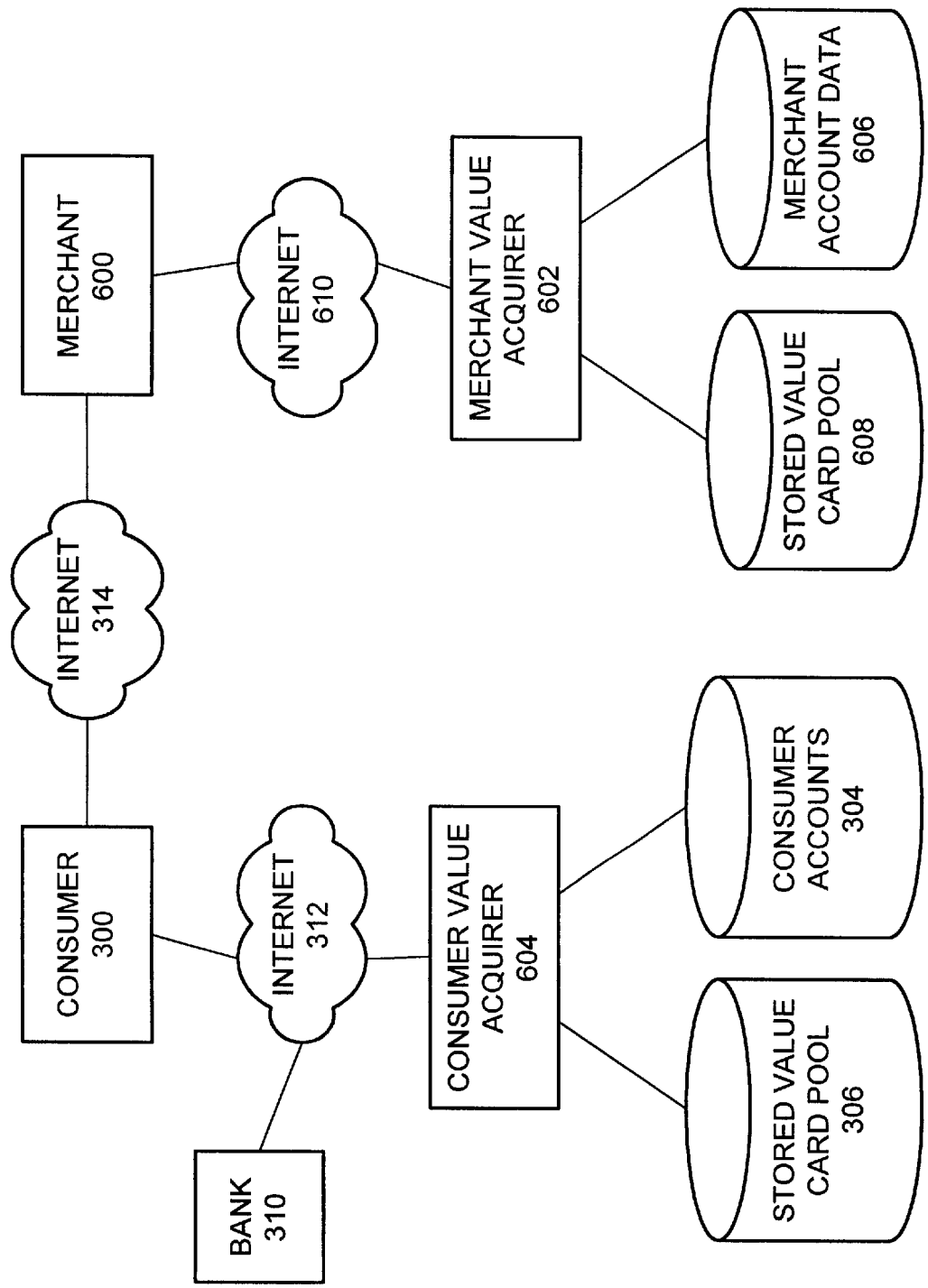
FIG. 6—Alternative embodiment of stored value card transaction—no merchant stored value card.

Referring to FIG. 6 an alternative embodiment of the present invention is shown. In this embodiment the merchant 600 or series of merchants can use a merchant value acquirer (MVA) 602 to interact with the consumer value acquirer 604. In a similar fashion, money is then transferred to the merchant 600 via the stored-value card approach or transferred to the appropriate merchant account 606 in the MVA 602. In this fashion the MVA 602 is interacting with the CVA 604 to transfer money from one to another. Money that is received by the MVA 602 is credited to the merchant's account 606 by appropriate message to the MVA database. The MVA 602 interacts with the CVA 604 using the stored value card protocol using any of number of cards in a card pool 608 possessed by the MVA.

As can be seen there are a series of alternative approaches to using store-value cards between merchants and consumers.

Although the present invention has been described in detail for purpose of illustration, it is understood that such detail is solely for that purpose, and variations can be made therein by those skilled in the art without departing from the spirit and scope of the invention. The method of the present invention is defined by the following claims.

I claim:

1. A method of making a stored-value card purchase for a consumer when the consumer does not use any stored-value card in the consumer's physical possession, the method comprising:

establishing a consumer value acquirer (CVA), remotely from the consumer, for storing consumer account funds;

transferring funds to the CVA;

the CVA holding the funds for the consumer in a consumer account;

establishing a plurality of stored value cards as a CVA card pool in physical possession of the CVA for interacting with one or more merchants which each have physical possession of a stored-value card;

the consumer placing an order through the CVA via a first network link;

the CVA transmitting the consumer order to a merchant via a second network link;

the merchant responding via the second network link to the consumer order by making a request for stored-value card funds of the consumer;

the CVA transferring stored-value card funds via the second network link to the merchant in response to the merchant request for stored-value card funds; and debiting the consumer account in the amount of funds requested by the merchant.

2. A system for facilitating stored-value card purchases by a consumer, when the consumer does not use any stored-value card in the consumer's physical possession, the system comprising:

a consumer terminal for transmitting a request from the consumer;

a consumer value acquirer (CVA) processor, physically remote from the consumer terminal, for communicating the request from the consumer to a merchant, the consumer terminal being connected with the CVA processor via a first network link;

the CVA processor having a consumer account database connected to the CVA processor;

a pool of stored value cards physically connected to the CVA processor;

the CVA processor embodying a communications protocol for transferring funds between stored-value cards;

a merchant processor having at least one stored-value card for accepting stored-value cards funds corresponding to orders by the consumer, the merchant processor being connected to the CVA processor via a second network link, the merchant processor sending a request for stored value funds to the CVA processor in response to receipt of the request from the consumer, wherein stored-value card funds corresponding to the request from the consumer are transferred from the pool of stored-value cards connected to the CVA processor to the at least one stored-value card of the merchant processor using the communications protocol for transferring funds between stored-value cards.

3. The system for facilitating stored-value card purchases of claim 2, further comprising a bank connected to the CVA processor via a network, wherein value is transferred from the bank to a consumer account in the consumer account database.

4. A system for facilitating stored-value card purchases by a consumer, the consumer not using any stored-value card in the consumer's physical possession, the system comprising:
- a consumer terminal for transmitting a request from the consumer;
- a consumer value acquirer (CVA) processor, physically remote from the consumer terminal for communicating the request from the consumer to a merchant, the consumer terminal being connected with the CVA processor via a first network link;
- the CVA processor having a consumer account database connected to the CVA processor;
- a pool of stored value cards physically connected to the CVA processor;
- the CVA processor embodying a communications protocol for transferring funds between stored-value cards;
- a merchant processor having at least one stored-value card for accepting stored-value cards funds corresponding to orders by the consumer, the merchant processor being connected to the consumer terminal via a second network link, the merchant processor sending a request for stored value funds to the CVA processor through the consumer terminal in response to receipt of the request from the consumer,
  wherein stored-value card funds are transferred from the CVA processor to the at least one stored-value card of the merchant processor through the consumer terminal using the communications protocol for transferring funds between stored-value cards.

5. The system for facilitating stored-value card purchases of claim 4, further comprising a bank connected to the CVA processor via a network, wherein value is transferred from the bank to a consumer account in the consumer account database.

6. A system for facilitating stored-value card purchases by a consumer from a merchant, without the consumer using a stored-value card in the consumer's physical possession, nor the merchant using a stored-value card in the merchant's physical possession, the system comprising:
- a consumer terminal for transmitting a request from the consumer;
- a consumer value acquirer (CVA) processor, physically remote from the consumer terminal, for communicating the request from the consumer to the merchant, the consumer terminal being connected with the CVA processor via a first network link;
- the CVA processor having a consumer account database connected to the CVA processor;
- a pool of stored-value cards physically connected to the CVA processor;
- the CVA processor embodying a communications protocol for transferring funds between stored-value cards;
- a merchant processor for accepting the order by the consumer; and
- a merchant value acquirer (MVA) processor for receiving and responding to the request by the consumer, the CVA processor being connected with the MVA processor via a second network link;
  wherein the MVA processor is connected with the merchant processor via a third network link, whereby stored-value card funds are transferred from the CVA processor to the MVA processor, using the communications protocol for transferring funds between stored-value cards to transfer funds from a stored-value card in the pool of stored-value cards to a stored-value card connected to the MVA processor, in response to the request by the consumer.

7. The system for facilitating stored-value card purchases of claim 6, further comprising a bank connected to the CVA processor via a network, wherein value is transferred from the bank to a consumer account in the consumer account database.

8. A system for facilitating stored-value card purchases by a consumer from a merchant, without the consumer using a stored-value card in the consumer's physical possession, nor the merchant using a stored-value card in the merchant's physical possession, the system comprising:
- a consumer terminal for transmitting a request from the consumer;
- a consumer value acquirer (CVA) processor, physically remote from the consumer terminal, for communicating the request from the consumer to the merchant, the consumer terminal being connected with the CVA processor via a first network link;
- the CVA processor having a consumer account database connected to the CVA processor;
- a pool of stored-value cards physically connected to the CVA processor;
- the CVA processor embodying a communications protocol for transferring funds between stored-value cards;
- a merchant processor for accepting the order by the consumer; and
- a merchant value acquirer (MVA) processor for receiving and responding to the request by the consumer, the consumer terminal being connected with the merchant processor via a second network link;
  wherein the merchant processor is connected with the MVA processor via a third network link, whereby stored-value card funds are transferred from the CVA processor to the MVA processor, using the communications protocol for transferring funds between stored-value cards to transfer funds from a stored-value card in the pool of stored-value cards to a stored-value card connected to the MVA processor, in response to the request by the consumer.

9. The system for facilitating stored-value card purchases of claim 8, further comprising a bank connected to the CVA processor via a network, wherein value is transferred from the bank to a consumer account in the consumer account database.

10. The method of making a stored-value card purchase of claim 1, wherein the transferring funds are transferred from the consumer's bank account.

11. A method of making a stored-value card purchase for a consumer when the consumer does not use any stored-value card in the consumer's physical possession, the method comprising:
- establishing a consumer value acquirer (CVA), remotely from the consumer, for storing consumer account funds;

transferring funds to the CVA;

the CVA holding the funds for the consumer in a consumer account;

establishing a plurality of stored-value cards as a CVA card pool in physical possession of the CVA for interacting with one or more merchants which each have physical possession of a stored-value card;

the consumer establishing a first network link with the CVA corresponding to an order;

the consumer transmitting the order to a merchant via a second network link;

the merchant responding to the consumer order by making a request for stored-value card funds of the consumer from the CVA via the first and second network links;

the CVA transferring, via the first and second network links, stored-value card funds to the merchant through the consumer in response to the merchant request for stored-value card funds; and debiting the consumer's account in the amount of funds requested by the merchant.

12. The method of making a stored-value card purchase of claim 11, wherein the transferring funds are transferred from the consumer's bank account.

13. A method of making a stored-value card purchase for a consumer when the consumer does not use any stored-value card in the consumer's physical possession, nor does the merchant use any stored-value card in the merchant's physical possession, the method comprising:

establishing a consumer value acquirer (CVA), remotely from the consumer, for storing consumer account funds;

transferring funds to the CVA;

the CVA holding the funds for the consumer in a consumer account;

establishinga plurality of stored value cards as a CVA card pool in physical possession of the CVA for interacting with one or more merchants;

establishing a merchant value acquire (MVA) for storing merchant account funds;

the consumer placing an order through the CVA via a first network link;

the CVA transmitting the order to the MVA via a second network link;

the merchant receiving the order from the MVA via a third network link;

the merchant responding to the order by making a request for stored-value card funds of the consumer from the CVA through the MVA;

the CVA transferring requested stored-value card funds to the MVA, via the second network link, in response to the merchant request for storedvalue card funds; and debiting the consumer account in the amount of funds requested by the merchant.

14. The method of making a stored-value card purchase of claim 13, wherein the transferring funds are transferred from the consumer's bank account.

15. A method of making a stored-value card purchase for a consumer when the consumer does not use any stored-value card in the consumer's physical possession, nor does the merchant use any stored-value card in the merchant's physical possession, the method comprising:

establishing a consumer value acquirer (CVA), remotely from the consumer, for storing consumer account funds;

transferring funds to the CVA;

the CVA holding the funds for the consumer in a consumer account;

establishing a plurality of stored value cards as a CVA card pool in physical possession of the CVA for interacting with one or more merchants;

establishing a merchant value acquirer (MVA) for storing merchant account funds;

the consumer placing an order to a merchant via a first network link;

the merchant responding to the order by making a request for stored-value card funds of the consumer from the CVA through the consumer;

the CVA transferring requested stored-value card funds to the consumer, via a second network link, in response to the merchant request for stored-value card funds;

the consumer transferring the requested stored-value card funds to the merchant via the first network link;

the merchant transferring the requested stored-value card funds to the MVA via a third network link; and debiting the consumer account in the amount of funds requested by the merchant.

16. The method of making a stored-value card purchase of claim 15, wherein the transferring funds are transferred from the consumer's bank account.

\* \* \* \* \*